(12) United States Patent
Kim et al.

(10) Patent No.: US 9,455,796 B2
(45) Date of Patent: Sep. 27, 2016

(54) METHOD AND APPARATUS FOR EXCHANGING INFORMATION BETWEEN BASE STATION AND TERMINAL

(71) Applicants: Samsung Electronics Co., Ltd., Gyeonggi-do (KR); INDUSTRY-ACADEMIC COOPERATION FOUNDATION, YONSEI UNIVERSITY, Seoul (KR)

(72) Inventors: Younsun Kim, Gyeonggi-do (KR); Sooyong Choi, Seoul (KR); Minchae Jung, Seoul (KR); Kyuho Hwang, Seoul (KR); Juho Lee, Gyeonggi-do (KR); Hyojin Lee, Gyeonggi-do (KR); Hyoungju Ji, Seoul (KR); Taehyoung Kim, Incheon (KR); Kyungsik Min, Seoul (KR); Junggyun Park, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 394 days.

(21) Appl. No.: 14/194,492

(22) Filed: Feb. 28, 2014

(65) Prior Publication Data

US 2014/0241192 A1 Aug. 28, 2014

(30) Foreign Application Priority Data

Feb. 28, 2013 (KR) .................. 10-2013-0021987

(51) Int. Cl.
| | |
|---|---|
| H04B 7/06 | (2006.01) |
| H04W 72/12 | (2009.01) |
| H04B 7/04 | (2006.01) |
| H04L 1/00 | (2006.01) |
| H04L 1/06 | (2006.01) |
| H04L 1/16 | (2006.01) |

(52) U.S. Cl.
CPC ........... *H04L 1/0026* (2013.01); *H04B 7/0417* (2013.01); *H04B 7/0452* (2013.01); *H04B 7/063* (2013.01); *H04B 7/0632* (2013.01); *H04B 7/0639* (2013.01); *H04L 1/06* (2013.01); *H04L 1/1671* (2013.01); *H04W 72/1226* (2013.01)

(58) Field of Classification Search
CPC ............ H04B 7/0632; H04B 7/0417–7/0421; H04B 7/0452; H04W 72/1226–72/1231
See application file for complete search history.

(56) References Cited

U.S. PATENT DOCUMENTS

| | | | | |
|---|---|---|---|---|
| 2010/0142633 | A1* | 6/2010 | Yu ........................ | H04B 7/0417 375/260 |
| 2011/0039547 | A1* | 2/2011 | van Rensburg ... | H04W 72/1252 455/423 |
| 2012/0076024 | A1* | 3/2012 | Ko ........................ | H04L 1/0026 370/252 |
| 2016/0006553 | A1* | 1/2016 | Kim ...................... | H04L 1/1671 370/252 |

* cited by examiner

*Primary Examiner* — Hoon J Chung (57) ABSTRACT

A method and apparatus of exchanging information on the number of layers which is supported commonly between the base station and the terminals in Multi-User Multiple Input Multiple Output (MU-MIMO) environment is provided for performance enhancement. The communication method of a terminal in a wireless communication system according to the present disclosure includes receiving a reference signal and information on a number of layers supportable simultaneously from a base station, measuring a channel state value based on the reference signal and the number of layers, determining whether the measured channel state value fulfills a minimum required channel state value, and transmitting, when the measured channel state value fulfills the minimum required channel state value, a value determined based on the measured channel state value to the base station.

20 Claims, 7 Drawing Sheets

METHOD AND APPARATUS FOR EXCHANGING INFORMATION BETWEEN BASE STATION AND TERMINAL

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0021987, filed on Feb. 28, 2013, which is hereby incorporated by reference for all purposes as if fully set forth herein.

TECHNICAL FIELD

The present disclosure relates to a wireless communication system and, in particular, a method and apparatus of exchanging information on the number of layers which is supported commonly between the base station and the terminals in Multi-User Multiple Input Multiple Output (MU-MIMO) environment for performance enhancement.

BACKGROUND

Recently, researches are conducted on the Multiple-Input Multiple-Output (MIMO) system using spatial resource for transmitting high quality data at a high data rate in a wireless communication environment.

The MIMO system can be classified into one of Single-User MIMO (SU-MIMO) for allocating one time-frequency resource to a single user and a Multi-User MIMO (MU-MIMO) for allocating one time-frequency resource to multiple users through spatial multiplexing.

Figure 1:
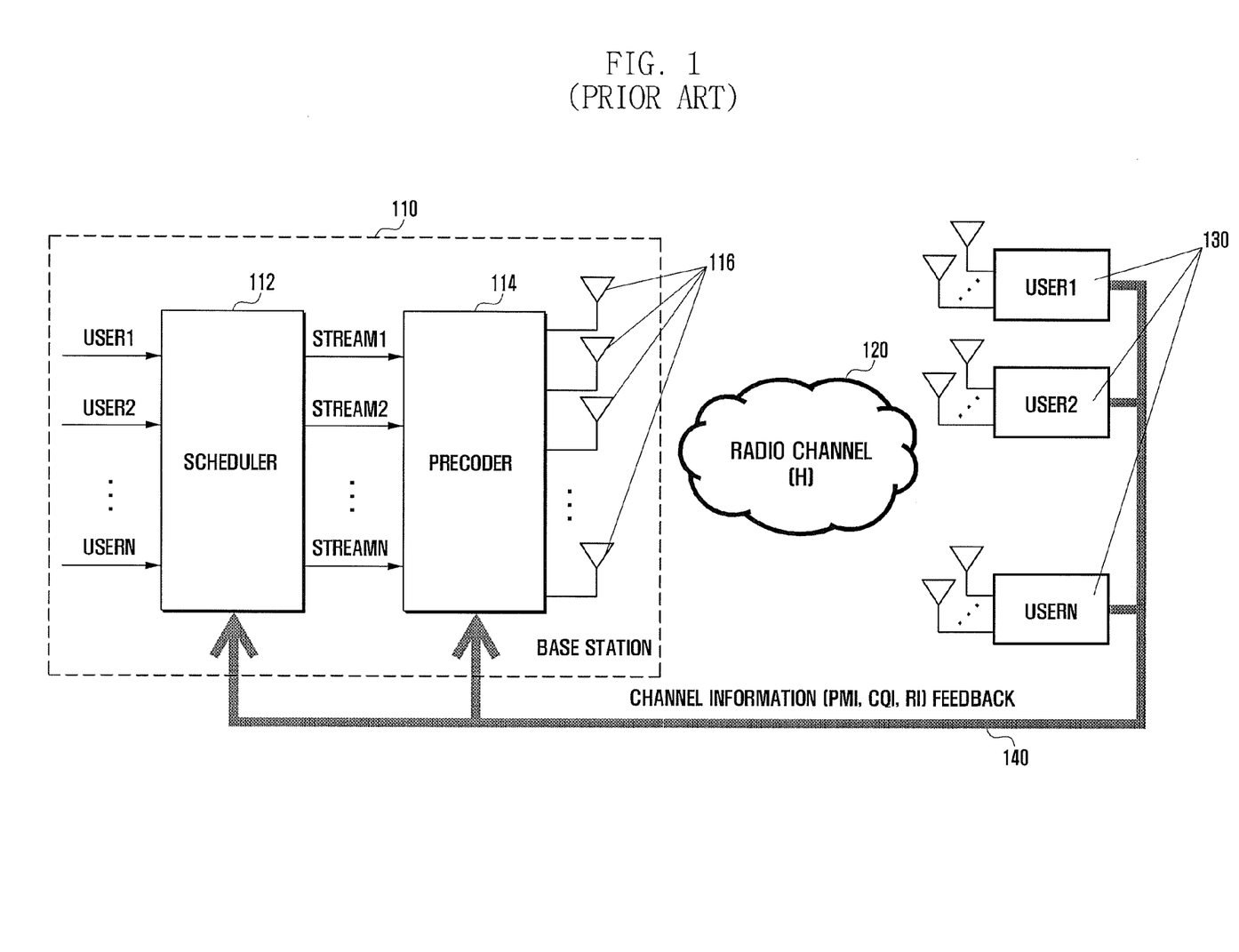
FIG. 1 illustrates a diagram of a MIMO system between a base station and a plurality of users.

FIG. 1 illustrates a diagram of a MIMO system between a base station and a plurality of users.

Referring to FIG. 1, the base station 110 and one or more terminals 130 are capable of communicating data through the radio channel 120. The channel information feedback 140 may be implemented through the radio channel 120 from the terminals 130 to the base station 110.

The base station 110 may include a scheduler 112 for scheduling data addressed to the terminal 130, a precoder for precoding the data streams scheduled by the scheduler 112, and a transceiver 116 for transmitting the precoded signals to the terminal 130 and receiving the signals transmitted by the terminals 130.

In a reference technology, the base station 110 may operate in a downlink communication mode of 3rd Generation Partnership Project Long Term Evolution (3GPP LTE). The base station 110 receives at least one of Precoding Matrix Index (PMI), Channel Quality Indicator (CQI), and Rank Indicator (RI) from the terminals 130; and performs precoding on the data based on the received information by means of the precoder 114 and transmits the precoded data. The data are precoded using a unitary matrix and then transmitted.

In the 3GPP LTE downlink communication mode, each terminal 130 feeds back at least one of PMI, CQI, and RI determined based on the state of the channel 120 and received quality.

In the downlink system operating in SU-MIMO mode, the interference affecting to the terminal is mainly determined depending on the signals from the neighbor base stations. In the downlink system operating in MU-MIMO mode, however, the signals transmitted on the different layers of the same time-frequency resource also may act as interference in addition to the signals transmitted by the neighbor base station, resulting in influence to the system performance.

The current 3GPP LTE-based terminal is capable of estimating the interference signals of neighbor base stations and thermal noise but not the inter-layer interference signals in MU-MIMO mode. For this reason, in the MIMO downlink system, the terminal feeds back PMI, CQI, and RI generated without reflecting the influence of inter-layer interference signals to the base station, resulting in performance degradation. There is therefore a need of a data communication method and apparatus capable of taking in consideration of inter-user interference in the MU-MIMO system.

SUMMARY

To address the above-discussed deficiencies, it is a primary object to provide a data communication method and apparatus that is capable of improving data communication performance in a MU-MIMO system.

Also, the present disclosure aims to provide a data communication method and apparatus that is capable of allowing a terminal to check at least one of PMI, CQI, and RI in consideration of radio channel condition and data communications of neighbor terminals.

Also, the present disclosure aims to provide a data communication method and apparatus that is capable of allowing a terminal or a base station to determine a number of terminals available for MU-MIMO service based on the radio channel condition and measurement result of the terminal.

Also, the present disclosure aims to provide a data communication method and apparatus that is capable of exchanging information on the inter-layer interference between the base station and terminals in a MU-MIMO system.

Furthermore, the present disclosure aims to provide a data communication method and apparatus that is capable of exchanging the information on the number of layers supportable simultaneously in the MU-MIMO downlink system, thereby improving the efficiency of the communication system.

In accordance with an aspect of the present disclosure, a communication method of a terminal in a wireless communication system is provided. The communication method includes receiving a reference signal and information on a number of layers supportable simultaneously from a base station, measuring a channel state value based on the reference signal and the number of layers, determining whether the measured channel state value fulfills a minimum required channel state value, and transmitting, when the measured channel state value fulfills the minimum required channel state value, a value determined based on the measured channel state value to the base station.

In accordance with another aspect of the present disclosure, a communication method of a base station in a wireless communication system is provided. The communication method includes determining a number of layers supportable simultaneously, transmitting a signal including the number of simultaneously supportable layers and reference signal to a terminal, and receiving, when a channel state value measured by the terminal based on the reference signal and the number of layers fulfills a minimum required channel state value, a signal including a value determined based on the measured channel state value from the terminal.

In accordance with another aspect of the present disclosure, a terminal of a wireless communication system is provided. The terminal includes a transceiver which receives a signal including a reference signal and information on a number of layers supportable simultaneously and a control unit measures a channel state value based on the reference signal and the number of layers, determines whether the measured channel state value fulfills a minimum required channel state value, and controls the transceiver to transmit, when the measured channel state value fulfills the minimum required channel state value, a value determined based on the measured channel state value to the base station.

In accordance with still another aspect of the present disclosure, a base station of a wireless communication system is provided. The base station includes a control unit which determines a number of layers supportable simultaneously and a transceiver which transmits a signal including the number of simultaneously supportable layers and reference signal to a terminal and receives, when a channel state value measured by the terminal based on the reference signal and the number of layers fulfills a minimum required channel state value, a signal including a value determined based on the measured channel state value from the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 2 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method.

Example embodiments of the present disclosure are described with reference to the accompanying drawings in detail.

Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

In an embodiment of the present disclosure, each of the base station and the terminal may include a transceiver for communicating data with another communication entity and a control unit for performing operation on the data transmitted/received by the transceiver and controlling the transceiver. The control unit may include at least one module for operation.

In an embodiment of the present disclosure, the information on the number of layers may include a number of users supportable by the base station simultaneously, a number of ranks, and a number of streams. In an embodiment of the present disclosure, the information on the number of layers is exchanged between the base station and the terminal to improve communication efficiency. In an embodiment, the number of layers supportable simultaneously may different from the actual number of layers for the base station to transmit data, and the terminal may use the number of layers in generating the channel state information. According to an embodiment of the present disclosure, the base station may send the terminal the information on the number of layers through one of higher layer signaling and physical layer signaling. The higher layer signaling may include Radio Resource Control (RRC) layer signaling. In more detail, if the channel variation time is greater than a predetermined value, the base station notifies the terminal of the number of layers through the higher layer signaling and, otherwise, the physical layer signaling.

In an embodiment, the terminal is capable of estimating interference based on at least one of thermal noise of the channel and inter-layer interference signal to estimate per-layer interference. In more detail, the base station is capable of estimating the average of the interference amounts between layers supportable simultaneously based on the information of precoder ranges of the users supportable simultaneously which is considered at the base station or the terminal and calculates the interference between layers supportable simultaneously by multiplying the estimated average value and the number of layers supportable simultaneously.

Figure 2:
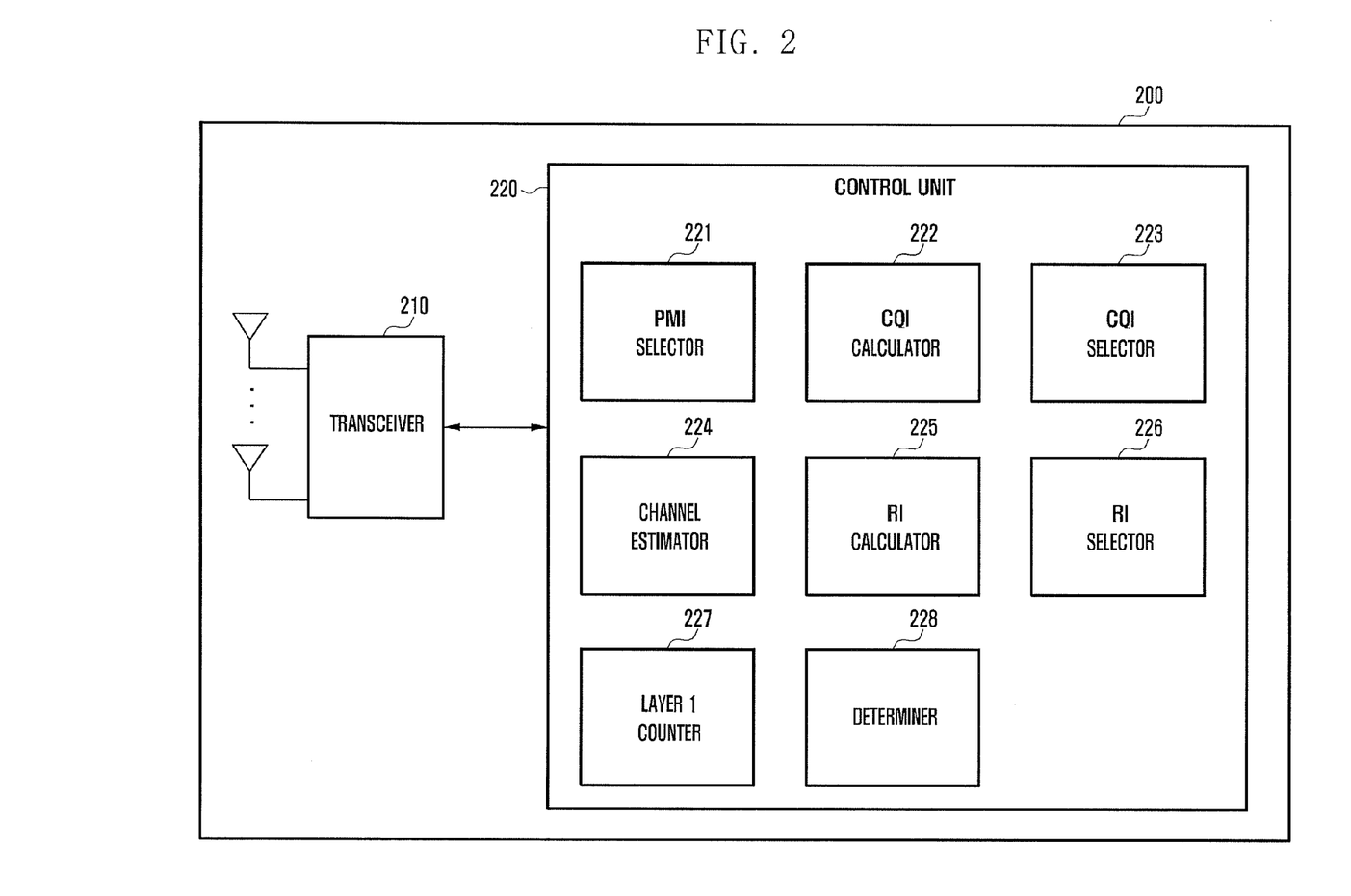
FIG. 2 illustrates a block diagram of a configuration of a terminal according to an embodiment of the present disclosure.

FIG. 2 illustrates a block diagram of a configuration of a terminal according to an embodiment of the present disclosure.

Referring to FIG. 2, the terminal 100 includes a transceiver 210 for data communication with another communication entity and a control unit 220 for performing operation based on the data communicated by the transceiver 210.

The transceiver 210 may communicate data with another communication entity through wired and wireless links.

The communication unit 220 includes at least one of PMI selector 221, a CQI calculator 222, a CQI selector 223, a channel estimator 224, an RI calculator 225, an RI selector 226, a layer counter 227, and a determiner 228.

The PMI selector 221 may select a PMI based on the signals transmitted and received.

The CQI calculator 222 calculates CQI based on the signal transmitted/received and the number of layer supportable simultaneously. According to an embodiment, the Signal to Interference plus Noise Ratio (SINR) may be calculated based on the interference components of neighbor users which are derived from the number of layers supportable simultaneously and the channel noise. In another embodiment, the SINR may be calculated based on the reference signal transmitted by the base station for use in selection of CQI.

The CQI selector 223 may select a CQI through Modulation and Coding Scheme (MCS) mapping based on the calculation result of the CQI calculator 222. According to an embodiment, the CQI selector 223 may select the CQI having the error probability equal to or less than a predetermined value in consideration of the channel state and interference state.

The channel estimator 224 may estimate the channel state based on the signals transmitted/received by the transceiver 210.

The RI calculator 225 may perform calculation for determining RI based on at least one of the signal received through the transceiver 210, estimation result of the channel estimator 224, and operation results of the CQI calculator 222 and CQI selector 223.

The RI selector 226 may select the best RI in consideration of the channel state based on the operation result of the RI calculator 225 and the interference of neighbor users.

The layer counter 227 may count the number of layers fulfilling minimum SINR for data communication of the terminal 200 based on the signals transmitted/received by the transceiver. The minimum CQI required per terminal may be changed depending on the embodiment. According to an embodiment, the layer counter 227 may measure SINR based on the reference signal transmitted by the base station and calculate the maximum number of layers capable of guaranteeing minimum SINR for communication of the terminal 200. The terminal 200 may feed back maximum number of layers and determine at least one of a number of layers available for communication with the terminal within the coverage and a scheduling mode based on the feedback result.

The determiner 228 may determine whether it is possible for the terminal to maintain the error probability of data communication below a predetermined value in the example of transmitting the signal with the number of layers supportable simultaneously which is determined based on at least one of the number of layers supportable simultaneously, the operation result of the CQI calculator 222, and the operation result of the RI calculator 225. According to an embodiment, the determiner 228 may control the transceiver 210 to transmit Acknowledgement/Negative Acknowledge (ACK/NACK) to the base station based on the determination result of the determiner 228 and transmit at least one of selected PMI, CQI, and RI along with the ACK/NACK. According to an embodiment, in the example of transmitting ACK, at least one of the CQI and RI acquired in consideration of the neighboring user interference based on the number of supportable layers that is transmitted by the base station may be transmitted along with the ACK. In the example of transmitting NACK, only one of the CQI and RI can be transmitted along with the NACK. In an embodiment, the number of layers supportable simultaneously which is determined by the base station and the terminal may differ from the number of layers for use in actual communication and may be used for notifying other communication entities of the number of layers supportable simultaneously.

Figure 3:
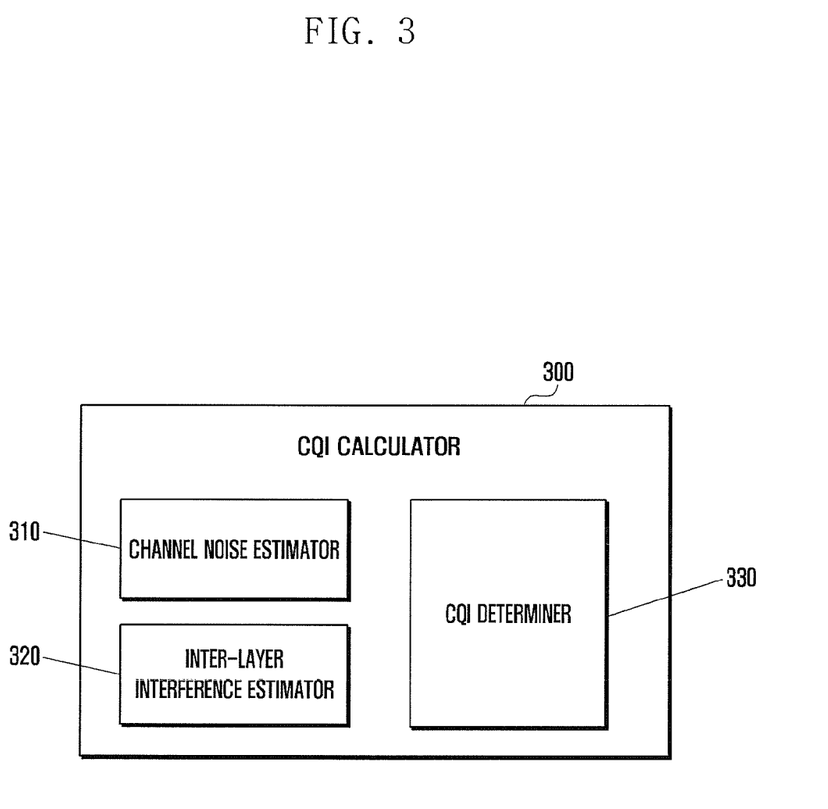
FIG. 3 illustrates a block diagram of a configuration of the CQI calculator of FIG. 2.

FIG. 3 illustrates a block diagram of a configuration of the CQI calculator of FIG. 2.

Referring to FIG. 3, the CQI calculator 300 includes a channel noise interference estimator 310, an inter-layer interference estimator 320, and a CQI determiner 330.

The channel noise interference estimator 310 may estimate the interference caused by the typical channel noise based on the signal received from the base station according to an embodiment of the present disclosure. The typical channel noise may include the thermal noise.

The inter-layer interference estimator 320 may estimate signal interference between layers supported by the base station simultaneously. According to an embodiment, the inter-layer interference estimator 320 may estimate the average value of the interference amount between layers supported simultaneously based on the information on the precoder ranges of the users considered currently to be supportable simultaneously. The inter-layer interference may be estimated based on the estimate average value and the number of layers supportable simultaneously, the inter-layer interference signal may be determined as the product between the estimated average value and the number of layers.

The CQI determiner 330 may determine the CQI based on the estimation results of the channel noise interference estimator 310 and inter-layer interference estimator 320. The CQI value may be determined through MCS mapping. According to an embodiment, the CQI determined in consideration of inter-layer interference may be referred to as Multi-User CQI (MU-CQI). The MU-CQI may the CQI value guaranteeing an error probability equal to or less than a predetermined value at the terminal in providing actual service on the simultaneously supportable layers.

Figure 4:
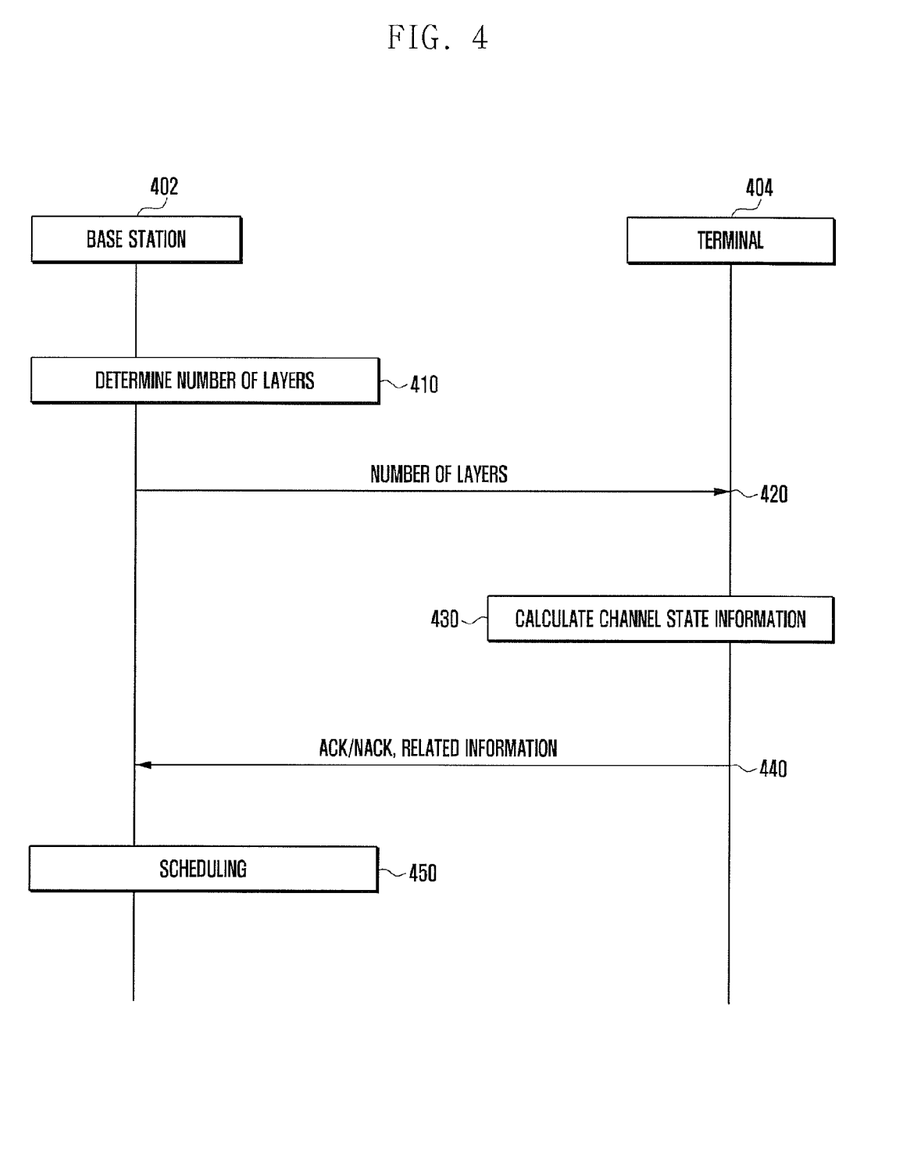
FIG. 4 illustrates a signal flow diagram of a data communication method between the base station and the terminal according to an embodiment of the present disclosure.

FIG. 4 illustrates a signal flow diagram of a data communication method between the base station and the terminal according to an embodiment of the present disclosure.

Referring to FIG. 4, the base station 402 and the terminal 404 communicate data.

The base station 402 determines a number of layers supportable simultaneously for MU-MIMO communication at operation 410. The number of simultaneously supportable layers may be determined based on at least one of channel condition, number of users to be served, number of terminals within the coverage, and communication state of the terminals within the coverage. According to an embodiment, the base station 402 may be aware of the MU-MIMO capabilities of the terminal 404 and the base station itself and determine the number of layers for MU-MIMO under the assumption of a certain scheduler. The base station 402 may perform user scheduling in consideration of the maximum throughput with the assumption of DFT codebook-based precoder.

The base station 402 sends the terminal 404 the information on the number of layers at operation 420. According to an embodiment, the base station 402 may send the information on the number of layers along with the information on the range of the codebook to be considered at the terminal.

The terminal 404 calculates the channel state information based on at least one of the signal received at operation 420 and the reference signal received from the base station 402. The channel state information may include at least one of PMI, CQI, and RI.

According to an embodiment, it is necessary to consider the channel noise component NO and inter-device interference on the multiple layers for calculating CQI value. It may be determined as equation (1).

$$\frac{P}{K}\sum_{j\neq k}|h_k w_j|^2 \approx \frac{P}{K}(K-1)D_{avg} \quad (1)$$

$$D_{avg} = \frac{1}{2^B - 1}\sum_{\substack{j=1 \\ j\neq k}}^{2^B}|h_k w_j|^2$$

Also, SINR may be calculated using equation (2).

$$SINR_k = \frac{\frac{P}{K}|h_k w_k|^2}{1 + \frac{P}{K}\sum_{j\neq k}|h_k w_j|^2} \approx \frac{\frac{P}{K}|h_k w_k|^2}{1 + \frac{P}{K}(K-1)D_{avg}} \quad (2)$$

Here, SINRk and SNRk denote SINR and SNR of the kth user, K denotes a number of users or layers participated in the communication, M denotes a number of base station antennas, B denotes a codebook size (bit), hk denotes the channel between the base station and kth user, wk denotes the precoder of the kth user, P denotes transmission SNR of the base station, and Davg denotes average interference component. In an embodiment, the terminal may calculate SINR for MU-MIMO based on at least one of the number of layers and the codebook range received at operation 420 and may calculate CQI through MCS mapping of the calculated SINR.

In an embodiment, the terminal 404 may determine whether the calculated SINRk is greater than the minimum SINR required by the terminal 404. If the SINRk is greater than the minimum SINR required by the terminal 404, the terminal 404 transmits ACK and, otherwise, NACK.

According to an embodiment, in order to calculate RI, it may be performed to compare the average interference amount of the users co-scheduled under the assumption of the example of using at the receiver.

If RI=1, the average interference amount is calculated as equation (3).

$$\tilde{D}_{avg} = \frac{1}{2^B - 1}\sum_{\substack{j=1 \\ j\neq k}}^{2^B}\frac{P}{K}\left(|\tilde{h}_{kj}^1|^2 + |\tilde{h}_{kj}^2|^2\right) \quad (3)$$

If RI=2, the average interference amount is calculated as equation (4).

If RI=1, the CQI is calculated as equation (5).

$$SINR_k = \frac{\frac{P}{K}\|H_k w_k\|^2}{1 + \frac{P}{K}\sum_{j\neq k}\|H_k w_j\|^2} \approx \frac{\frac{P}{K}|h_k w_k|^2}{1 + (K-1)\tilde{D}_{avg}} \quad (5)$$

If RI=2, the CQI is calculated as equation (6).

$$SINR_k^l = \frac{\frac{P}{2K}|g_k^l H_k w_k|^2}{\|g_k^l\|^2 + \frac{P}{2K}\sum_{j\neq k}|g_k^l H_k w_j|^2} \approx \frac{\frac{P}{2K}|g_k^l H_k w_k|^2}{\|g_k^l\|^2 + (K-1)\hat{D}_{avg}^l} \quad (6)$$

The terminal 404 is capable of determined RI maximizing the entire communication efficiency by comparing equations (5) and (6) with each other. The RI determined based on MU-CQI is referred to as MU-RI. In an embodiment, the MU-RI may be RI to be determined actually when the communication system operates in the MU-MIMO mode.

The terminal 404 may send the base station 402 the information including the value calculated at operation 430.

In an embodiment, if the SINR calculated based on information of the number of layers which is received at operation 420 is equal to or greater than the minimum SINR required by the terminal 404, the terminal 404 sends the base station 402 the ACK signal and, otherwise, the NACK signal.

In the embodiment of transmitting the ACK signal, the terminal 404 may sends the base station 402 at least one of PMI, CQI, and RI calculated based on the number of layers notified at operation 420 along with the ACK signal.

In the embodiment of transmitting the NACK signal, the terminal 404 may sends the base station 402 at least one of PMI, CQI, and RI calculated under the assumption of SU-MIMO along with the NACK signal. In an embodiment, the PMI, CQI, and RI under the assumption of SU-MIMO may be calculated at operation 430.

At operation 450, the base station 402 performs scheduling based on the information received at operation 440.

Figure 5:
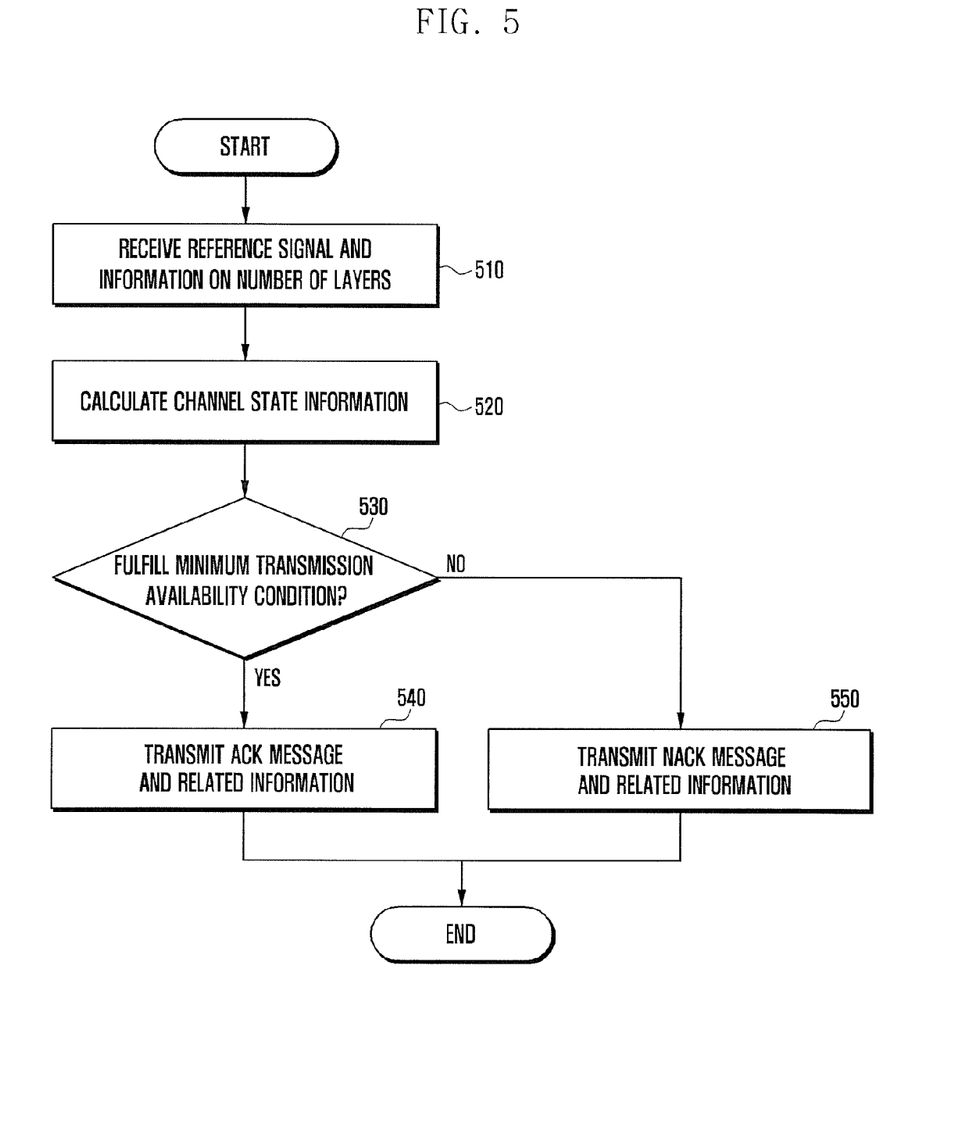
FIG. 5 illustrates a process of the terminal procedure in the data communication method according to an embodiment of the present disclosure.

FIG. 5 illustrates a process of the terminal procedure in the data communication method according to an embodiment of the present disclosure.

Referring to FIG. 5, the terminal receives a signal including at least one of reference signal and number of simultaneously supportable layers from the base station at operation 510. In an embodiment, the information on the number of simultaneously supportable layers may include at least one of number of users supportable by the base station simultaneously, number of ranks, and number of streams. The reference signal may include information for use in channel state measurement at the terminal.

At operation 520, the terminal calculates the channel state information based on the signal received at operation 510. The channel state information may include at least one of PMI, CQI, and RI. According to an embodiment, the calculation at operation 520 may be included in the calculation performed at operation 430 of FIG. 4.

The terminal determines the SINR calculated at operation 520 fulfills the minimum SINR required for communication of the terminal at operation 530.

If the minimum SINR is fulfilled, the terminal sends the base station the related information along with the ACK signal at operation 540. The related information may include at least one of PMI, CQI, and RI calculated in consideration of the number of layers which is notified at operation 510.

If the minimum SINR is not fulfilled at operation 530, the terminal sends the base station the related information along with the NACK signal at operation 550. The related information may include at least one of PMI, CQI, and RI calculated under the assumption of SU-MIMO.

As described above, the terminal transmits at least one of PMI, CQI, and RI calculated based on the reference signal transmitted by the base station and the number of layers supportable simultaneously, it is possible to improve reliability of the measurement information transmitted to the base station for use in scheduling.

Figure 6:
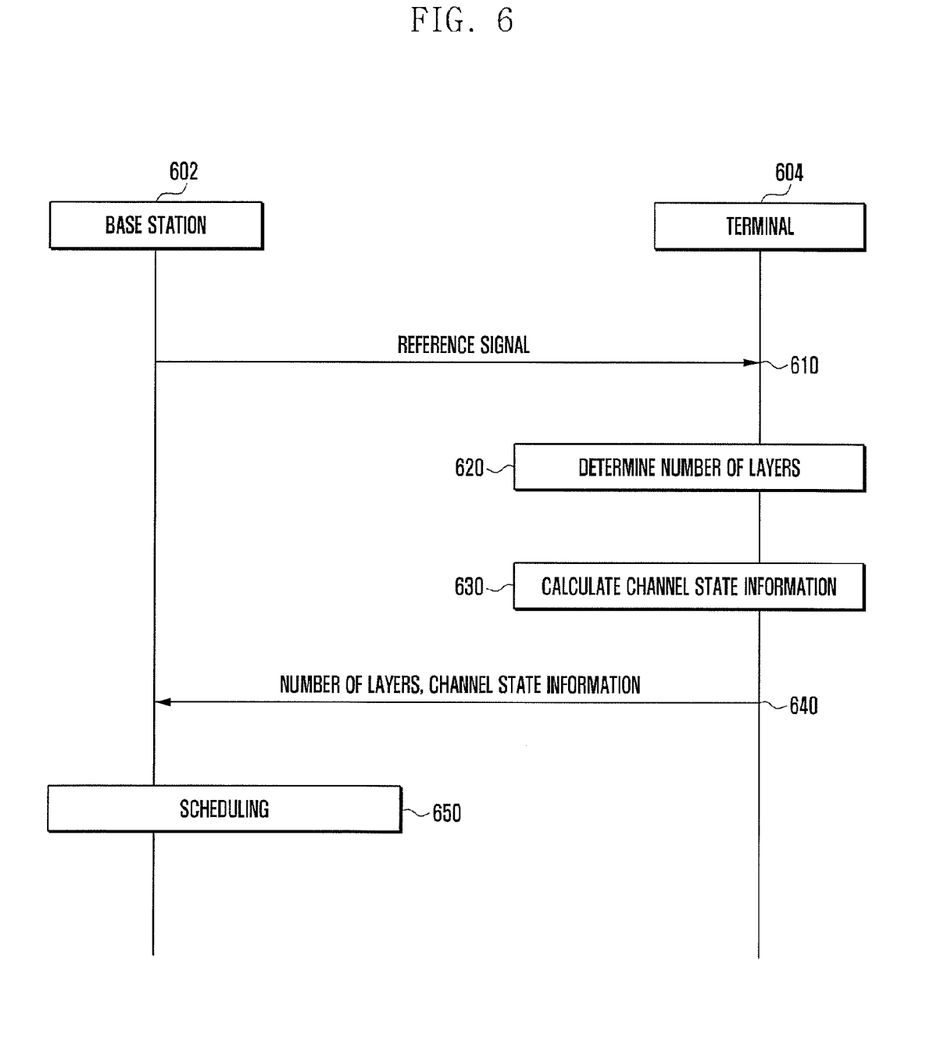
FIG. 6 illustrates a signal flow diagram of a data communication method between the base station and the terminal according to another embodiment of the present disclosure.

FIG. 6 illustrates a signal flow diagram of a data communication method between the base station and the terminal according to another embodiment of the present disclosure.

Referring to FIG. 6, the base station 602 communicates signals with the terminal 640.

The base station 602 transmits the reference signal to the terminal 604 at operation 610. The terminal 640 measures channel state based on the reference signal. According to an embodiment, the reference signal may include all of the signals for use in measuring channel state at the terminal. In an embodiment, the terminal 604 may measure SINR based on the reference signal. In an embodiment, if the measured SINR fulfills the minimum SINR required by the terminal 604, the terminal 640 may select CQI through MCS mapping based on the calculated SINR.

At operation 620, the terminal 640 determines a number of layers supportable simultaneously based on the signal received at operation 610. In an embodiment, if the number of simultaneously supportable layers is equal to or greater than 2, the SINR measured at the terminal decreases as compared to the example where the number of simultaneously supportable layers is 1. Accordingly, the terminal 604 may select the maximum number of layers which fulfils the minimum SINR for normal operation of the terminal 604. In order to determine the number of layers, equations (1) to (6) may be used.

At operation 630, the terminal 604 calculates the channel state information based on the number of layers which is determined at operation 620 and the signal received at operation 610. The channel state information may include at least one of PMI, CQI, and RI. In order to calculate the channel state information, the method of operation 430 of FIG. 4 may be used.

The terminal 640 sends the base station 602 at least one of the determined number of layers and the channel state information at operation 640.

At operation 650, the base station 602 performs scheduling based on the information received at operation 640.

Figure 7:
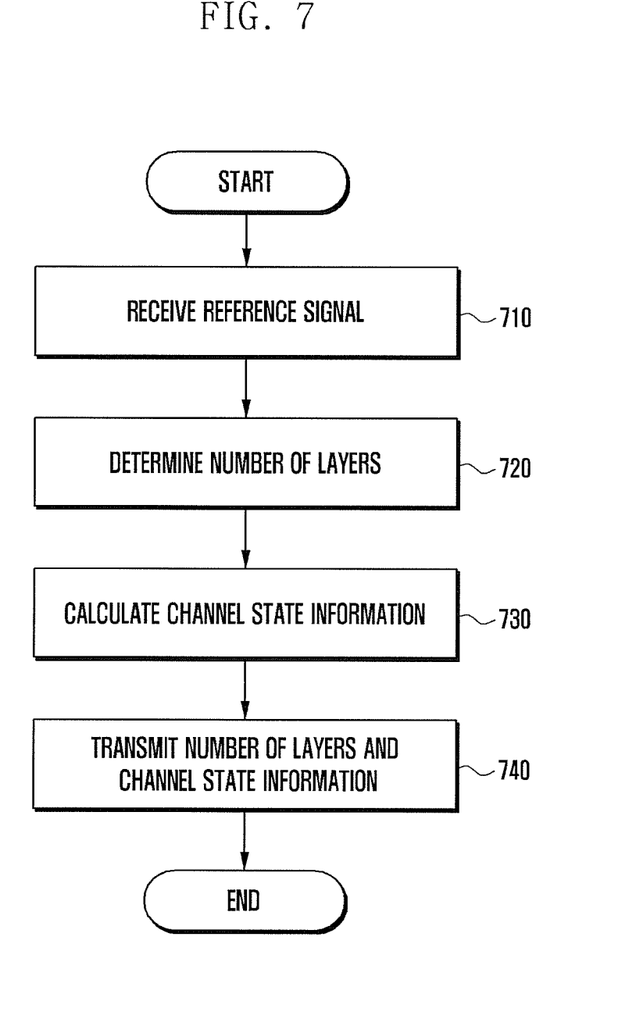
FIG. 7 illustrates a process of the terminal procedure in the data communication method according to an embodiment of the present disclosure.

FIG. 7 illustrates a flowchart of the terminal procedure in the data communication method according to an embodiment of the present disclosure.

Referring to FIG. 7, the terminal receives the reference signal transmitted by the base station at operation 710. The terminal measures SINR based on the reference signal and channel state. In an embodiment, if the measured SINR fulfills the minimum SINR required at the terminal, the terminal may select CQI through MCS mapping based on the calculated SINR.

At operation 720, the terminal determines a number of layers supportable simultaneously based on the measurement result of operation 710. In an embodiment, if the number of simultaneously supportable layers is equal to or greater than 2, the SINR at the terminal decreases as compared to the example where the number of simultaneously supportable layers is 1. Accordingly, the terminal may select the maximum number of layers capable of fulfilling the minimum SINR for normal operation of the terminal. In order to determine the number of layers, equations (1) to (6) may be used.

At operation 730, the terminal calculates channel state information based on the number of layers which is determined at operation 720 and the reference signal received at operation 710. The channel state information may include at least one of PMI, CQI, and RI. In order to calculate the channel state information, the method of operation 430 of FIG. 4 may be used.

The terminal sends the base station at least one of the determined number of layers and channel state information at operation 740.

As described above, the data communication method is capable of allowing the terminal to recommend a number of layers for fulfilling the minimum SINR required for normal communication and notify the base station of this such that the base station determine the number of layers to be sued actually in MU-MIMO mode. In this way, the base station is capable of determining the number of layers which maximize the transmission efficiency and scheduling based on the determination result.

It is to be appreciated that those skilled in the art can change or modify the embodiments without departing the technical concept of this disclosure. Accordingly, it should be understood that above-described embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

The data communication method and apparatus of the present disclosure is capable of measuring PMI, CQI and RI in consideration of neighboring terminals to determine a number of users available for the MU-MIMO service and providing the MU-MIMO services based thereon, resulting in improvement of the communication system efficiency.

Also, the data communication method and apparatus of the present disclosure is capable of allowing the base station or the terminal to determine the number of users fulfilling the minimum required CQI based on the measurement of the terminal and the base station performs scheduling based on the determined value, resulting in improvement of communication system throughput.

Although the present disclosure has been described with an example embodiment, various changes and modifications may be suggested to one skilled in the art. It is intended that the present disclosure encompass such changes and modifications as fall within the scope of the appended claims.

What is claimed is:

1. A communication method of a terminal in a wireless communication system, the method comprising:
   receiving a reference signal and information on a number of layers supportable simultaneously from a base station;
   measuring a channel state value based on the reference signal and the number of layers;
   determining whether the measured channel state value fulfills a minimum required channel state value; and transmitting, when the measured channel state value fulfills the minimum required channel state value, a value determined based on the measured channel state value to the base station.

2. The method of claim 1, further comprising determining a Channel Quality Indicator (CQI) based on the measured channel state value,
wherein transmitting of the value comprises transmitting a signal including the CQI to the base station.

3. The method of claim 2, further comprising determining a Rank Indicator (RI) based on the CQI,
wherein the transmitting of the value comprises transmitting the RI to the base station.

4. The method of claim 1, wherein the transmitting of the value comprises transmitting, when the measured channel state value fulfills the minimum required channel state value, a signal including an acknowledgement (ACK).

5. The method of claim 1, further comprising:
measuring, when the measured channel state value does not fulfills the minimum required channel state value, the channel state based on the reference signal; and
transmitting a signal including the measured channel state value and a negative acknowledgement (NACK).

6. A communication method of a base station in a wireless communication system, the method comprising:
determining a number of layers supportable simultaneously;
transmitting a signal including the number of simultaneously supportable layers and reference signal to a terminal; and
receiving, when a channel state value measured by the terminal based on the reference signal and the number of layers fulfills a minimum required channel state value, a signal including a value determined based on the measured channel state value from the terminal.

7. The method of claim 6, wherein the receiving of the signal comprises receiving the signal including a Channel Quality Indicator (CQI) determined based on the channel state value measured by the terminal.

8. The method of claim 7, wherein the receiving of the signal comprises receiving the signal including a Rank Indicator (RI) determined based on the CQI.

9. The method of claim 6, wherein the receiving of the signal comprises receiving, when the measured channel state value fulfills the minimum required channel state value, the signal including acknowledgement (ACK).

10. The method of claim 6, wherein the receiving of the signal comprises receiving, when the measured channel state value does not fulfill the minimum required channel state value, the signal including the value determined based on the measured channel state value and a negative acknowledgement (NACK).

11. A terminal of a wireless communication system, the terminal comprising:
a transceiver configured to receive a signal including a reference signal and information on a number of layers supportable simultaneously; and
a control unit configured to measure a channel state value based on the reference signal and the number of layers, determine whether the measured channel state value fulfills a minimum required channel state value, and control the transceiver to transmit, when the measured channel state value fulfills the minimum required channel state value, a value determined based on the measured channel state value to the base station.

12. The terminal of claim 11, wherein the control unit is configured to determine a Channel Quality Indicator (CQI) based on the measured channel state value and control the transceiver to transmit a signal including the CQI to the base station.

13. The terminal of claim 12, wherein the control unit is configured to determine a Rank Indicator (RI) based on the CQI and control the transceiver to transmit the RI to the base station.

14. The terminal of claim 11, wherein the control unit is configured to control, when the measured channel state value fulfills the minimum required channel state value, the transceiver to transmit a signal including acknowledgement (ACK).

15. The terminal of claim 11, wherein the control unit is configured to measure, when the measured channel state value does not fulfills the minimum required channel state value, the channel state value based on the reference signal and control the transceiver to transmit a signal including the measured channel state value and negative acknowledgement (NACK).

16. A base station of a wireless communication system, the base station comprising:
a control unit configured to determine a number of layers supportable simultaneously; and
a transceiver configured to transmit a signal including the number of simultaneously supportable layers and reference signal to a terminal and receive, when a channel state value measured by the terminal based on the reference signal and the number of layers fulfills a minimum required channel state value, a signal including a value determined based on the measured channel state value from the terminal.

17. The base station of claim 16, wherein the transceiver is configured to receive the signal including a Channel Quality Indicator (CQI) determined based on the channel state value measured by the terminal.

18. The base station of claim 17, wherein the transceiver is configured to receive the signal including a Rank Indicator (RI) determined based on the CQI.

19. The base station of claim 16, wherein the transceiver is configured to receive, when the measured channel state value fulfills the minimum required channel state value, the signal including acknowledgement (ACK).

20. The base station of claim 16, wherein the transceiver is configured to receive, when the measured channel state value does not fulfill the minimum required channel state value, the signal including the value determined based on the measured channel state value and a negative acknowledgement (NACK).

* * * * *